United States Patent
Cohen (10) Patent No.: US 8,306,062 B1
(45) Date of Patent: Nov. 6, 2012

(54) METHOD AND APPARATUS OF ADAPTIVE LARGE RECEIVE OFFLOAD

(75) Inventor: Rami Cohen, Haifa (IL)

(73) Assignee: Marvell Israel (M.I.S.L) Ltd., Yokneam (IL)

( * ) Notice: Subject to any disclaimer, the term of this patent is extended or adjusted under 35 U.S.C. 154(b) by 365 days.

(21) Appl. No.: 12/650,920

(22) Filed: Dec. 31, 2009

Related U.S. Application Data (60) Provisional application No. 61/141,727, filed on Dec. 31, 2008.

(51) Int. Cl.
*H04J 3/24* (2006.01)
(52) U.S. Cl. ...................................................... 370/473
(58) Field of Classification Search .......... 370/229–235, 370/389–394, 395.5–395.52, 469–477
See application file for complete search history.

(56) References Cited

U.S. PATENT DOCUMENTS

| | | | |
|---|---|---|---|
| 2007/0022212 A1* | 1/2007 | Fan | 709/238 |
| 2008/0091868 A1* | 4/2008 | Mizrachi et al. | 710/263 |
| 2009/0232137 A1* | 9/2009 | Cherian et al. | 370/392 |

OTHER PUBLICATIONS

Grossman, Large Receive Offload Implementation in Neterion 10GbE Ethernet driver, Proceedings of the Linux Symposium, vol. One, 8 pages, 2005.*
Menon et al, Optimizing TCP Receive Performance, USENIX '08: 2008 USENIX Annual Technical Conference, 14 pages, 2008.*

* cited by examiner

*Primary Examiner* — Frank Duong (57) ABSTRACT

Aspects of the disclosure provide a method for large receive offload (LRO). The method adaptively changes a number of packets aggregated in an aggregated packet based on a packet loss state in a network. The method reduces reception stack overhead while reducing waiting time for LRO time-out. The method includes receiving a packet belonging to a packet stream transmitted from a sender to a receiver, detecting a size of a sliding window used by the sender to transmit packets, adjusting an LRO threshold indicating a maximum number of packets allowed in an aggregated packet as a function of the size of the sliding window, and aggregating incoming packets into an aggregated packet based on the adjusted LRO threshold.

16 Claims, 6 Drawing Sheets

```
RECEIVE_TCP_PACKET(packet)
{ if(number_of_aggregated_segments==0)    // first segment
    aggregate_packet();    // add segment
else{
    if(TCP sequence number does not match the last aggregated sequence number){    // retransmission
        max_segment_to_aggregate=1;
        send_aggregated_segments_as_one_TCP_frame();
    }
    aggregate_packet();
} if(exception(){    // TCP flags: SYN, FIN, RST, URG, or short packet, etc.
    send_aggregated_segments_as_one_TCP_frame();
    return;
} if(number_of_aggregated_fragment >= max_segment_to_aggregate){
    send_aggregated_segments_as_one_TCP_frame();
    max_segment_to_aggregate++;
    if(max_segment_to_aggregate>MAX_SEGMENT) max_segment_to_aggregate=MAX_SEGMENT;
    return;
}
```

METHOD AND APPARATUS OF ADAPTIVE LARGE RECEIVE OFFLOAD

INCORPORATION BY REFERENCE

This application claims the benefit of U.S. Provisional Application No. 61/141,727, "Adaptive TCP with Large Receive Offload Threshold" filed on Dec. 31, 2008, which is incorporated herein by reference in its entirety.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Offload approaches can be used in network devices to reduce network stack processing overheads. In an example, a network device uses a large segment offload (LSO) technique to reduce a transmission stack overhead for packet transmission processing. In another example, a network device uses a large receive offload (LRO) technique to reduce a reception stack overhead for packet reception processing.

SUMMARY

Aspects of the disclosure can provide a method for large receive offload (LRO). The method can adaptively change a number of packets aggregated in an aggregated packet to reduce reception stack overhead while reducing instances of LRO time-out. According to an aspect of the disclosure, the number of packets aggregated in the aggregated packet can be adjusted based on a packet loss state.

In an embodiment, the method includes receiving a packet belonging to a packet stream transmitted from a sender to a receiver, detecting a size of a sliding window, such as a TCP sliding window, used by the sender to transmit the packet stream. The size of the sliding window can be determined based on the received packet and/or transmitted acknowledgements (ACKs). Further, the method includes adjusting an LRO threshold indicating a maximum number of packets allowed in an aggregated packet as a function of the size of the sliding window, and aggregating incoming packets into an aggregated packet based on the adjusted LRO threshold.

To detect the size of the sliding window, the method includes detecting the received packet corresponding to a re-transmission of the packet that happens when a previous transmission of the packet is lost in the network, and determining a size reduction of the sliding window caused by the re-transmission of the packet. Accordingly, to adjust the LRO threshold, the method includes reducing the LRO threshold in accordance with the size reduction of the sliding window.

To detect the received packet corresponding to the re-transmission of the packet, the method includes tracking on a first sequence number of the packet and/or a second sequence number of an acknowledgement packet, and determining the received packet corresponding to the re-transmission of the packet based on these sequence numbers.

In an embodiment, the method includes detecting that the sender reduces the size of the sliding window, for example, to one or two segments, in response to a packet loss, and reducing the LRO threshold accordingly.

In addition, in accordance with an embodiment, the method includes determining that the reception of the packet results in a non-duplicate acknowledgement to the sender. In response to the non-duplicate acknowledgement, the sender increases the size of the sliding window. Accordingly, in an embodiment, the method includes increasing the LRO threshold in accordance with the increased size of the sliding window. Further, in an embodiment, the method includes processing the aggregated packet as a single packet in at least one network processing layer in a network processing stack.

According to an embodiment of the disclosure, the method can be implemented as program instructions stored in a computer readable medium.

Aspects of the disclosure also provide a network device. The network device includes a network interface, a large receive offload (LRO) engine, and a controller. The network interface is configured to receive packets transmitted from a sender device via a network. The LRO engine is configured to aggregate the received packets into an aggregated packet based on an LRO threshold that indicates a maximum number of packets allowed in the aggregated packet. The controller is configured to detect a packet loss state in the network and adjust the LRO threshold based on the packet loss. In an embodiment, a size of a sliding window, such as a TCP sliding window, used by the sender device to transmit packets, is adjusted based on the packet loss state in the network. Thus, the controller is configured to detect the size of the sliding window used by the sender device based on a received packet and/or an acknowledgement, and adjust the LRO threshold as a function of the size of the sliding window.

In an example, the controller detects the received packet corresponding to a re-transmission of the packet that happens when a previous transmission of the packet is lost in the network. The controller determines a size reduction of the sliding window caused by the re-transmission of the packet, and reduces the LRO threshold in accordance with the size reduction of the sliding window. In an example, the controller is configured to track on sequence numbers of the received packets and/or sequence numbers in the transmitted acknowledgements, and detect the received packet corresponding to the re-transmission of the packet based on the tracking.

In an embodiment, the controller detects that the sender reduces the size of the sliding window, for example, to one or two, in response to a packet loss. The controller then reduces the LRO threshold accordingly.

Additionally, the controller determines that the reception of the packet results in an acknowledgement to the sender. The sender can increase the size of the sliding window in response to the acknowledgement. Then, the controller increases the LRO threshold in accordance with the size increase of the sliding window.

According an embodiment of the disclosure, the aggregated packet is provided to a relatively higher network processing layer in a network processing stack. The relatively higher network processing layer processes the aggregated packet as a single packet to reduce processing overhead. In an example, the relatively higher network processing layer is implemented by a processor executing software instructions.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

Figure 1:
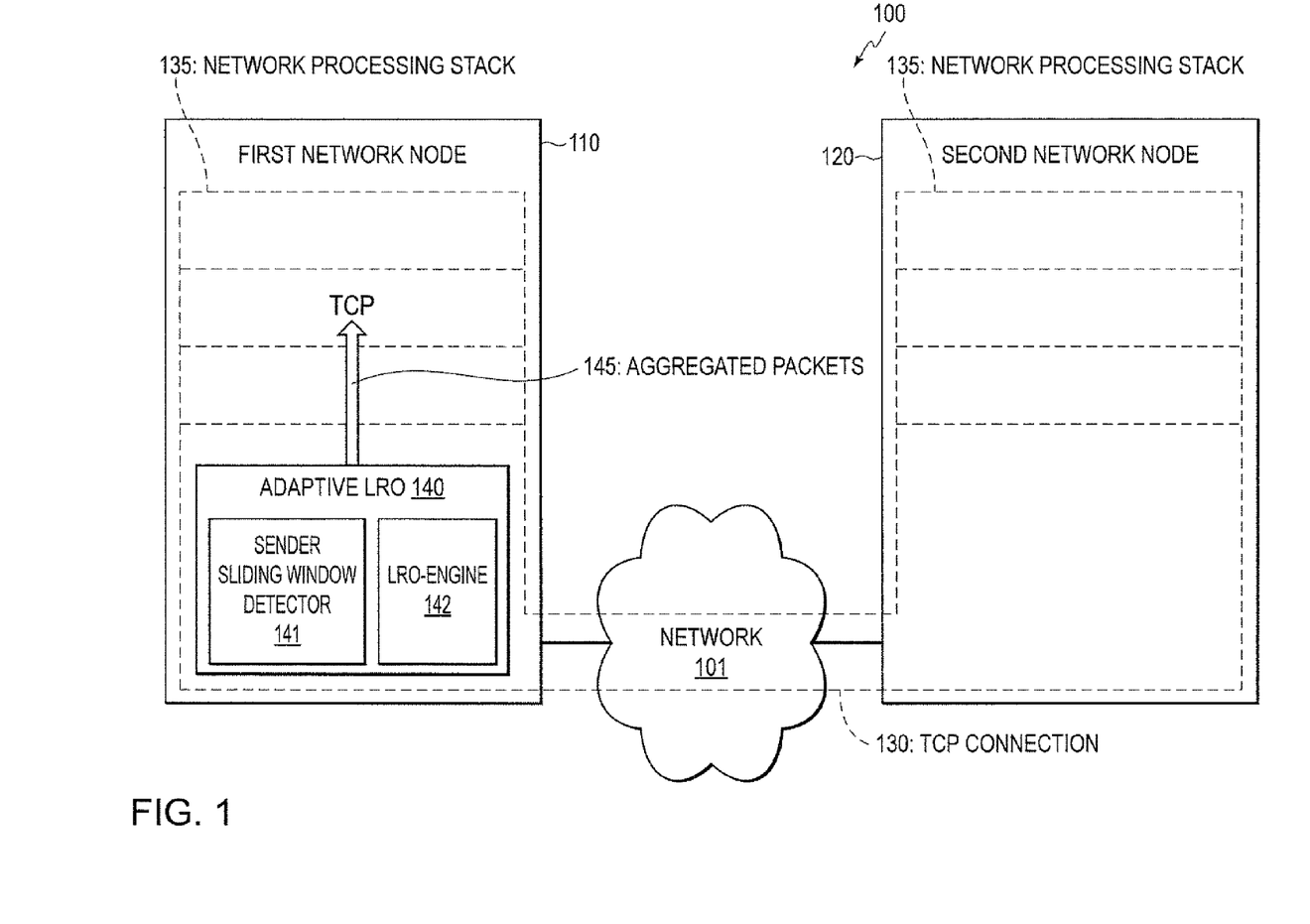
FIG. 1 shows a block diagram of an adaptive large receive offload system example 100 according to an embodiment of the disclosure.

FIG. 1 shows a block diagram of an adaptive large receive offload (LRO) system example 100 according to an embodiment of the disclosure. As seen in FIG. 1, the adaptive LRO system 100 includes a first network node 110 and a second network node 120 coupled to a network 101. The first network node 110 and the second network node 120 set up a communication channel, such as a transmission control protocol (TCP) connection 130, through the network 101. Thus, the first and second network nodes 110 and 120 transmit signals between each other via the TCP connection 130.

The network 101 can be wired, wireless, a local area network (LAN), a wireless LAN (WLAN), a fiber optical network, a wide area network (WAN), a peer-to-peer network, the Internet, etc. or any combination of these that interconnects the first network node 110 and the second network node 120.

In accordance with an embodiment, the first network node 110 and the second network node 120 are devices of any suitable type that allow for the transmission and/or reception of communication signals. For example, in an embodiment, the first network node 110 and the second network node 120 are cellular phones, computers, personal digital assistants, video telephones, and the like. Other suitable communication devices are also contemplated. Similarly, the first network node 110 and the second network node 120 include any suitable network device, such as a network interface card, network adaptor, and the like, that can suitably couple the first network node 110 and the second network node 120 to the network 101 via any suitable link, such as a direct serial/parallel connection, cellular telephone link, RF and/or IR link, satellite communication link, fiber optical cable, and the like.

The first network node 110 and the second network node 120 are implemented with any suitable algorithm, standard, protocol, and the like, that can set up the TCP connection 130 between the two network nodes. Through the TCP connection 130, the two network nodes 110 and 120 can transmit signals to each other, and can receive signals from each other.

Generally, network nodes process signal transmission and signal reception according to a plurality of network processing layers. For example, each of the first network node 110 and the second network node 120 includes a network processing stack 135, such as a TCP processing stack. The network processing stack 135 includes a plurality of network processing layers. In an example, a TCP processing stack includes, from bottom to top, a network layer, an internet protocol (IP) layer, a TCP layer, and an application layer.

When the first network node 110 transmits signals, for example, the plurality of network processing layers, from top to bottom, act on the signals for transmission. For example, the application layer initiates a message for transmission, and provides the message to the TCP layer. The TCP layer receives the message, and suitably acts on the received message. For example, the TCP layer generates a TCP header based on the message, packages the TCP header with the message into a TCP packet, and provides the TCP packet to the IP layer. The IP layer then receives the TCP packet, and suitably acts on the TCP packet. For example, the IP layer generates an IP header based on the TCP packet, and packages the IP header with the TCP packet into an IP packet, and provides the IP packet to the network layer. The network layer receives the IP packet and suitably acts on the IP packet. In an embodiment, the network layer includes suitable hardware and software that transmits the IP packet in a suitable form onto the suitable link coupled to the network node. In an example, the network layer transmits electrical signals corresponding to raw bits in the IP packet onto the suitable link. In another example, the network layer splits the IP packet into multiple split packets and transmits electrical signals corresponding to raw bits in the multiple split packets. It is noted that one or more network processing layers may be suitably skipped during processing.

When the first network node 110 receives signals, for example, the plurality of network processing layers, from bottom to top, act on the received signals. For example, the network layer includes suitable hardware and software that can receive a bit stream from the suitable link coupled to the network node. The network layer suitably acts on the received bit stream. For example, the network layer can collect the bit steam into an IP packet, and provides the IP packet to the IP layer. The IP layer receives the IP packet, and suitably acts on the IP packet. For example, the IP layer obtains an IP header and a TCP packet from the IP packet, checks the TCP packet based on the IP header, and provides the TCP packet to the TCP layer. The TCP layer receives the TCP packet, and suitably acts on the TCP packet. For example, the TCP layer obtains a TCP header and a data portion from the TCP packet, checks the data portion based on the TCP header and provides the data portion to the application layer. The application layer receives the data portion, and suitably acts on the data portion. It is noted that one or more network processing layers may be suitably skipped during processing.

To act on a received packet, a network processing layer consumes processing power. For example, the TCP layer can be implemented by TCP software instructions executed by a processor. Thus, when a TCP packet is provided to the TCP layer, a TCP interrupt to the processor is generated. In response to the TCP interrupt, the processor executes the TCP software instructions to suitably act on the TCP packet. Thus, packet processing at a network layer introduces packet processing overhead. The packet processing overhead at a network processing layer is substantially proportional to a number of packets received at the network processing layer.

To reduce the packet processing overhead for packet reception, some network devices are configured to implement large receive offload (LRO), typically at a relatively low network processing layer. At the relatively low network processing layer, in accordance with LRO techniques, a plurality of packets belonging to a same packet stream are aggregated into an aggregated packet. Then, the aggregated packet, instead of the plurality of packets, is provided to a relatively higher network processing layer. The relatively higher network processing layer then acts on the aggregated packet, instead of on each of the packets in the plurality of packets. Thus, the packet processing overhead at the relatively higher network processing layer is reduced. Similarly, the packet processing overheads at network processing layers that are higher than the relatively higher network processing layer are also reduced.

Generally, an LRO technique includes an LRO threshold. The LRO threshold indicates a maximum number of packets allowed in an aggregated packet. When using a fixed LRO threshold, time can be wasted while waiting for an LRO time-out to happen. In an example, a receiver has an LRO threshold that is fixed at four. Based on the fixed LRO threshold, the receiver aggregates packets received from a sender. The sender sends two packets first, and waits for an acknowledgement from the receiver to send more packets. Thus, the receiver receives the first two packets, and waits for more packets to aggregate based on the fixed LRO threshold. In an example, an acknowledgement from the receiver is originated by a relatively higher network processing layer when the relatively higher network processing layer receives an aggregated packet. Due to the reason that not enough packets are received by the receiver to generate an aggregated packet, no acknowledgement is transmitted to the sender, and thus the sender will not send additional packets. The receiver waits for a specific time, for example, a pre-determined time in the LRO technique, without receiving more packets, an LRO time-out happens. The LRO time-out can increase an average packet transmission time, such as a round-trip time (RTT), between the sender and the receiver, and affect packet transmission efficiency.

According to an embodiment of the disclosure, the first network node 110 includes an adaptive LRO module 140 in a relatively lower network processing layer. When the second network node 120 transmits a packet stream to the first network node 110, the adaptive LRO module 140 aggregates received packets into an aggregated packet based on an adaptive LRO threshold. The adaptive LRO threshold indicates a maximum number of packets allowed in the aggregated packet. The adaptive LRO threshold is adjusted, e.g. to reduce instances of LRO time-out, while maximizing reception stack overhead reduction. For example, the adaptive LRO threshold can be adjusted based on a packet loss state in the network 101. Thus, when the network 101 has no packet loss, the adaptive LRO threshold is increased to reduce the reception stack overhead. When the network 101 has packet loss, the adaptive LRO threshold is reduced to reduce the waiting time for LRO time-out.

In an embodiment, the adaptive LRO threshold is adaptively adjusted as a function of a size of a sliding window, such as a TCP sliding window, used by the second network node 120 to transmit the packet stream. The sliding window indicates a number of packets can be sent by the second network node 120 without receiving an acknowledgement (ACK) from the first network node 110.

Generally, the second network node 120 adjusts the sliding window in accordance with a packet loss state in the network 101. It is noted that the packet loss state is related to various network parameters, such as the congestion in the network 101, the receiving memory space of the first network node 110, and the like. In a slow start process example, the second network node 120 initiates the sliding window to be one packet, for example. The second network node 120 sends one packet from the packet stream. The packet includes a sequence number, such as 1. Then, the second network node 120 waits for response from the first network node 110. When the packet is successfully received by the first network node 110, the first network node 110 returns an acknowledgement (ACK) with the sequence number 1 to the second network node 120. When the second network node 120 receives the ACK with the sequence number 1, the second network node 120 knows that the packet with the sequence number 1 has been successfully received by the first network node 110. Thus, one packet has been transmitted in a round-trip time (RTT), and the second network node 120 has a transmission rate of one packet per RTT.

Upon transmission success, in accordance with an embodiment, the second network node 120 tries to increase the transmission rate. For example, the second network node doubles the size of the sliding window to two. Then, the second network node 120 sends next two packets, for example, a packet with a sequence number 2, and a packet with a sequence number 3, from the packet stream. Then, the second network node 120 waits for response from the first network node 110. When the two packets are successfully received by the first network node 110, the first network node 110 sends an ACK with the sequence number 3 (or two ACKs respectively with the sequence number 2 and sequence number 3) to the second network node 120. The ACK with the sequence number 3 can indicate that the first network node 110 has successfully received packets with the sequence numbers 1 to 3. When the second network node 120 receives the ACK, the second network node 120 has successfully transmitted two packets in an RTT. The second network node 120 may further increase the size of the sliding window to four, and so on and so forth.

However, when the second network node 120 does not receive an ACK indicating a transmitted packet has been successfully received after waiting for a certain time, the second network node 120 can reduce the sliding window, or even reset the sliding window to one or two, for example. In an example, when the second network node 120 receives multiple duplicate ACKs with a same sequence number, for example, N-1, the second network node 120 determines that a packet with a sequence number N is lost in the network 101. Thus, the second network node 120 re-transmits the packet with the sequence number N, and also divides the size of the sliding window by two. In another example, the second network node 120 has a time-out while waiting for an ACK with the sequence number N. The second network node 120 re-transmits the packet with the sequence number N, and resets the sliding window to one or two, for example, to begin a slow start process.

While the second network node 120 adjusts the sliding window for transmission, the adaptive LRO module 140 in the first network node 110 adjusts the adaptive LRO threshold as a function of the size of the sliding window. In an embodiment, the adaptively LRO threshold is adjusted to be equal or smaller than the size of the sliding window to reduce instances of LRO time-out. For example, the adaptive LRO threshold is adjusted to equal the size of the sliding window. Thus, based on the adaptive LRO threshold that is the same as the size of the sliding window, the first network node 110 aggregates received packets that are sent by the second network node 120, into an aggregated packet, and provides the aggregated packet to a relatively high network processing layer without waiting for LRO time-out.

The adaptive LRO module 140 detects a packet loss state in the network 101 and adjusts the adaptive LRO threshold based on the packet loss state. The adaptive LRO module 140 can use any suitable mechanism to detect the packet loss state. In an embodiment, the adaptive LRO module 140 further includes a sender sliding window detector unit 141, and an LRO engine 142 to perform adaptive LRO functions. It is noted that the adaptive LRO module 140 can be implemented using other operational and structural elements. Additional operational and structural elements are discussed with reference to FIG. 3.

The sender sliding window detector unit 141 detects the size of the sliding window used by the second network node 120, and adjusts the adaptive LRO threshold. The LRO engine 142 then aggregates incoming packets based on the adjusted adaptive LRO threshold.

Various techniques are suitable for detecting the size of the sliding window. In an embodiment, for example, the size of the sliding window is included in a packet, such as a header field of the packet. Then, the packet is transmitted by the second network node 120 to the first network node 110. The first network node 110 can obtain the size of the sliding window from the packet header. In another embodiment, the size of the sliding window is not explicitly indicated by the second network node 120. However, the sender sliding window detector unit 141 can detect the size of the sliding window based on environmental conditions, such as packet reception timings, packet sequence numbers, LRO time-out events, priority information regarding the connection, transmission protocols used by the second network node 120, and the like. In an example, the first network node 110 detects that second network node 120 uses a transmission protocol that begins a slow start process when three duplicate ACKs are received. More specifically, according to the transmission protocol, the second network node 120 detects a packet loss when three duplicate ACKs are received. Upon the packet loss detection, according to the transmission protocol, the second network node 120 reduces the size of the sliding window to one or two, for example, and retransmits the lost packet. Further, according to the transmission protocol, the second network node 120 begins a slow start process that gradually increases the size of the sliding window, for example, when non-duplicate ACKs are received. Thus, when the first network node 110 sends three duplicated ACKs with a sequence number N-1, for example, to the second network node 120, the first network node 110 may expect the second network node 120 to begin a slow start process, and retransmit the packet with the sequence number N. When the first network node 110 receives a packet with the sequence number N, the sender sliding window detector unit 141 detects that the second network node 120 begins a slow start process. The adaptive LRO module 140 then resets the adaptive LRO threshold to one, for example.

It is noted that the second network node 120 may also include an adaptive LRO module (not seen). Thus, when the first network node 110 transmits a packet stream to the second network node 120, the adaptive LRO module in the second network node 120 can adaptively aggregate incoming packets, and avoid LRO time-out.

Figure 2A:
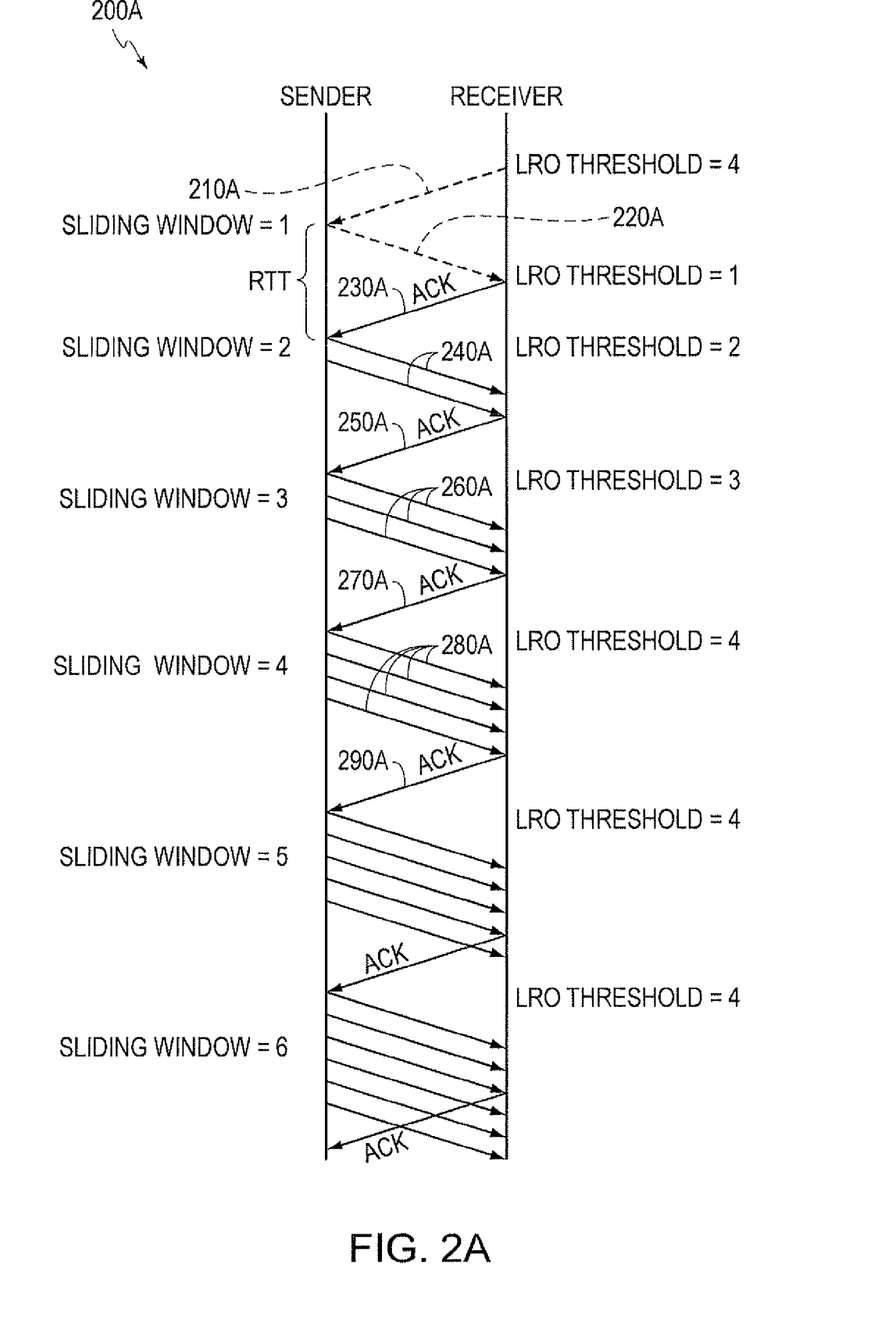
FIGS. 2A and 2B show large receive offload examples 200A and 200B according to an embodiment of the disclosure.

FIG. 2A shows an adaptive large receive offload example 200A according to an embodiment of the disclosure. In FIG. 2A, a sender sends a packet stream based on a sliding window, and a receiver aggregates packets based on an adaptive LRO threshold. In the example, the adaptive LRO threshold is adjusted as a function of a size of the sliding window.

More specifically, the sender sends a number of packets based on the size of the sliding window. The size of the sliding window is adjusted based on any suitable transmission protocol. In an example, when the sender receives an non-duplicate acknowledgement (ACK) in response to previously transmitted packets, the sender increases the size of the sliding window by one, for example. The non-duplicate ACK indicates that previously transmitted packets based on the size of the sliding window have been successfully received by the receiver. However, when the sender receives duplicate ACKs indicating a packet loss, the sender resets the size of the sliding window to one, for example, and re-transmits the lost packet.

The receiver can use any suitable method to detect the size of the sliding window, and adjusts the LRO threshold in accordance with the size of the sliding window. In an embodiment, the receiver detects the transmission protocol used by the sender, and can detect the sliding window based on the transmission protocol, ACKs, packet sequence numbers, and the like.

In the FIG. 2A example, the receiver has an LRO threshold of size 4 at a time. Then, a packet loss happens. For example, a packet having a sequence number of N is lost, and does not arrive at the receiver. The packet loss causes the receiver to send duplicate ACKs. For example, the receiver sends a third duplicate ACK 210A that is the same as previous two ACKs. The third duplicate ACK 210A indicates a packet loss. Accordingly, the sender resets the sliding window to one, and re-transmits the packet 220A with the sequence number N to the receiver.

The receiver receives the packet 220A with the sequence number N. In an example, based on the sequence number N, the receiver detects that packet 220A is a re-transmission, and the sender has reset the sliding window. The receiver resets the LRO threshold to one. Accordingly, based on the LRO threshold, the receiver aggregates the received packet into an aggregated packet. The aggregated packet is further processed by a relatively higher network processing layer. The relatively higher network processing layer originates an ACK 230A to the sender to acknowledge a success of receiving and aggregating. It is noted that the ACK 230A may have a sequence number that is larger than N. Due to the reason that the receiver knows that the ACK 230A will cause the sender to increase the size of the sliding window, the receiver increases the LRO threshold to two.

When the sender receives the ACK 230A, the sender increases the sliding window to two, and transmits two packets 240A. When the receiver receives the two packets 240A, the receiver aggregates the two packets into an aggregate packet based on the LRO threshold that is two at the time. The aggregated packet is further processed by the relatively higher network processing layer. The relatively higher network processing layer originates an ACK 250A to the sender to acknowledge a success of receiving and aggregating the two packets. Due to the reason that the receiver knows that the ACK 250A will cause the sender to increase the size of the sliding window, the receiver increases the LRO threshold to three.

When the sender receives the ACK 250A, the sender increases the sliding window to three, and transmits three packets 260A. When the receiver receives the three packets 260A, the receiver aggregates the three packets into an aggregate packet based on the LRO threshold that is three at the time. The aggregated packet is further processed by the relatively higher network processing layer. The relatively higher network processing layer originates an ACK 270A to the sender to acknowledge a success of receiving and aggregating the three packets. Due to the reason that the receiver knows that the ACK 270A will cause the sender to increase the size of the sliding window, the receiver increases the LRO threshold to four.

When the sender receives the ACK 270A, the sender increases the sliding window to four, and transmits four packets 280A. When the receiver receives the four packets 280A, the receiver aggregates the four packets into an aggregate packet based on the LRO threshold that is four at the time. The aggregated packet is further processed by the relatively higher network processing layer. The relatively higher network processing layer originates an ACK 290A to the sender to acknowledge a success of receiving and aggregating the four packets.

In an embodiment, the LRO threshold can not exceed a maximum value. In the FIG. 2A example, the maximum value is four. Other suitable values for aggregating packets are contemplated. Thus, the LRO threshold stays at four, while the ACK 290A causes the sender to increase the sliding window to five, and so on and so forth.

As described above, in accordance with an embodiment, the receiver adjusts the LRO threshold based on the sliding window used by the sender. Thus, the receiver aggregates received packets based on the adjusted LRO threshold without LRO time-out.

Figure 2B:
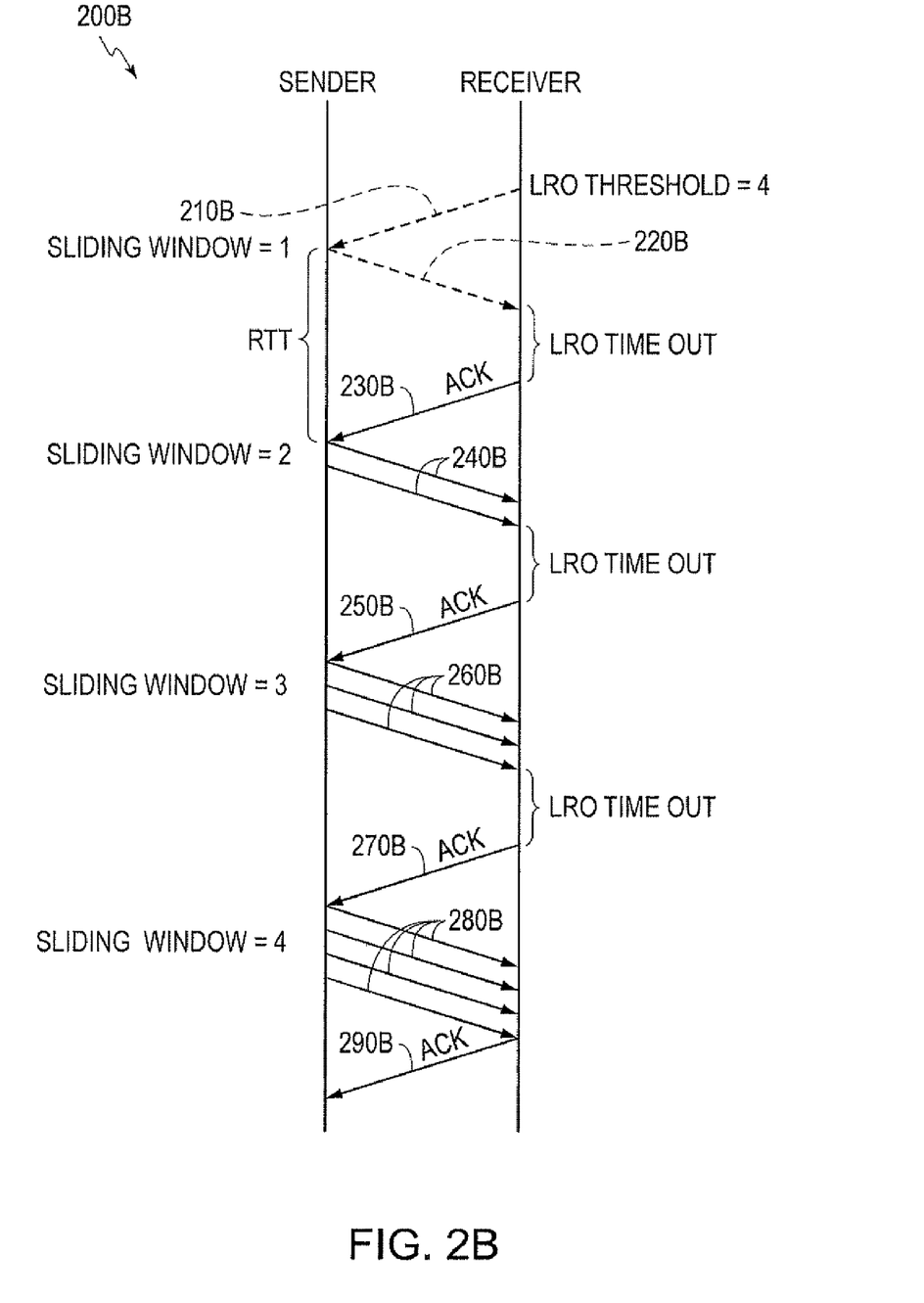

FIG. 2B shows a large receive offload example 200B having a fixed LRO threshold. In FIG. 2B, a sender sends a packet stream based on a sliding window, and a receiver aggregates packets based on a fixed LRO threshold of four.

In the FIG. 2B example, a packet loss happens. Similar to the 200A, a packet having a sequence number of N is lost, and does not arrive at the receiver. The packet loss causes the receiver to send duplicate ACKs. For example, the receiver sends a third duplicate ACK 210B that is the same as previous two ACKs. The third duplicate ACK 210B indicates a packet loss. Accordingly, the sender resets the sliding window to one, and re-transmits the packet 220B with the sequence number N to the receiver.

The receiver receives the packet 220B with the sequence number N. Due to the reason that the LRO threshold is four, the receiver waits for more packets to come for aggregation until a LRO time out. When the LRO time out happens, the receiver aggregates the received packets into an aggregated packet. The aggregated packet is further processed by a relatively higher network processing layer. The relatively higher network processing layer originates an ACK 230E to the sender to acknowledge a success of receiving and aggregating. It is noted that the ACK 230A may have a sequence number that is larger than N.

When the sender receives the ACK 230B, the sender increases the sliding window to two, and transmits two packets 240B. The receiver receives the two packets 240B. Due to the reason that the LRO threshold is four, the receiver waits for more packets to come for aggregation until a LRO time out. When the LRO time out happens, the receiver aggregates the received two packets into an aggregated packet. The aggregated packet is further processed by the relatively higher network processing layer. The relatively higher network processing layer originates an ACK 250B to the sender to acknowledge a success of receiving and aggregating.

When the sender receives the ACK 250B, the sender increases the sliding window to three, and transmits three packets 260B. The receiver receives the three packets 260B. Due to the reason that the LRO threshold is four, the receiver waits for more packets to come for aggregation until a LRO time out. When the LRO time out happens, the receiver aggregates the received three packets into an aggregated packet. The aggregated packet is further processed by the relatively higher network processing layer. The relatively higher network processing layer originates an ACK 270B to the sender to acknowledge a success of receiving and aggregating.

When the sender receives the ACK 270B, the sender increases the sliding window to four, and transmits four packets 280B. The receiver receives the four packets 260B, and aggregates the received four packets into an aggregated packet. The aggregated packet is further processed by the relatively higher network processing layer. The relatively higher network processing layer originates an ACK 290B to the sender to acknowledge a success of receiving and aggregating.

As described above, the fixed LRO threshold in the LRO example 200B causes LRO time-outs which occur as a result of waiting for packets to come, but that do not arrive. The LRO time-outs increase an average RTT. As can be seen, the RTT in 200B is larger than the RTT in 200A. Further, the sender takes more time to increase the sliding window.

Figure 3:
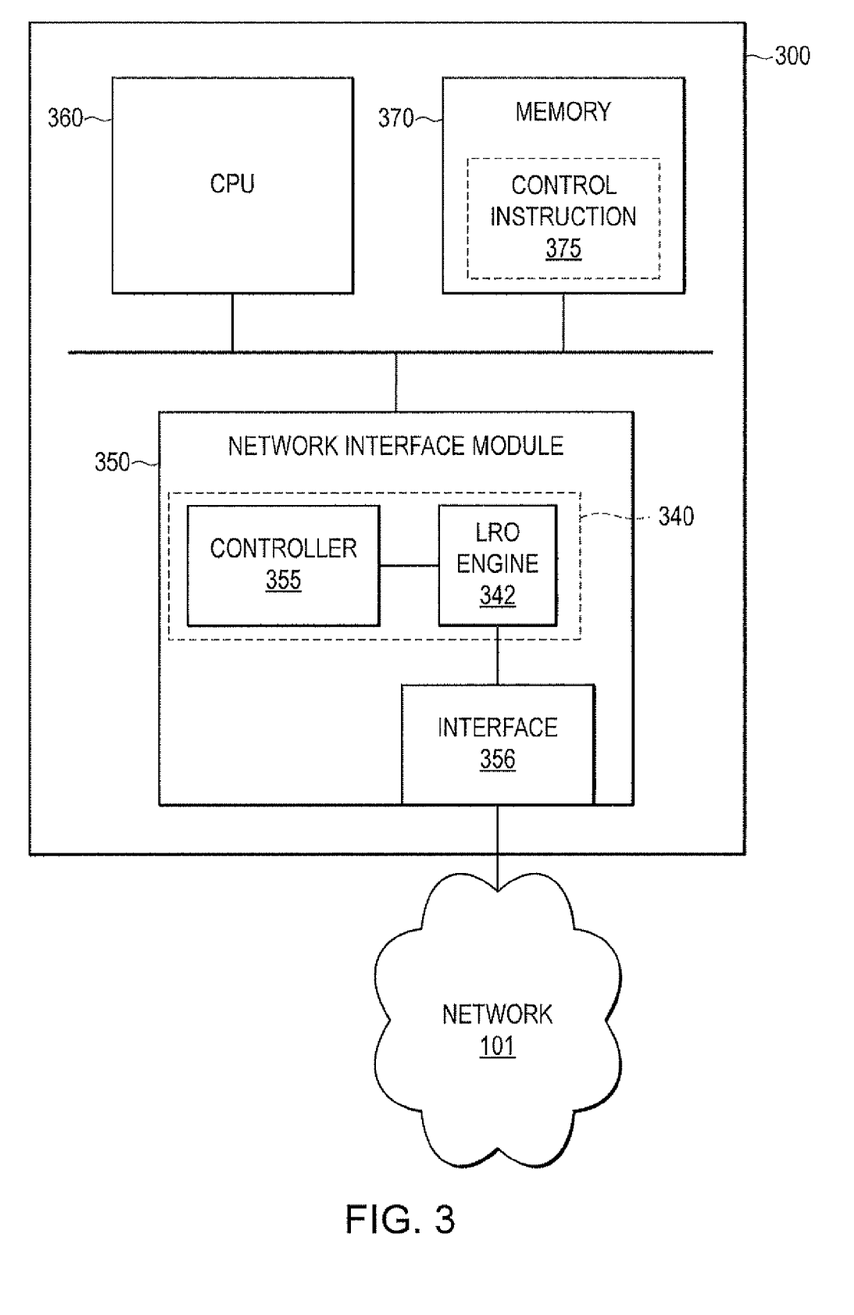
FIG. 3 shows a block diagram of a network device example 300 according to an embodiment of the disclosure.

FIG. 3 shows a block diagram of a network device example 300 according to an embodiment of the disclosure. The network device 300 includes a network interface module 350, a central processing unit (CPU) 360, a memory unit 370, and the like. These components can be coupled together as seen in FIG. 3.

The network interface module 350 includes any suitable network interface device, such as a network interface card, network adaptor, and the like, that can suitably couple the network device 300 to a network 101. The network interface module 350 further includes an interface circuit 356 and an adaptive LRO module 340.

The interface circuit 356 includes a transmitting portion and a receiving portion coupled to any suitable link. The transmitting portion includes circuits for transmitting electrical signals corresponding to a bit stream on the suitable link. The receiving portion includes circuits for receiving electrical signals from the suitable link, and obtaining a bit stream corresponding to packets from the electrical signals. The receiving portion can further include a queue for buffering the packets.

The adaptive LRO module 340 detects a packet loss state in the network 101, adaptively adjusts an LRO threshold based on the packet loss state, and aggregates received packets into an aggregated packet based on the adjusted LRO threshold. The LRO threshold indicates a maximum number of packets allowed in an aggregated packet. The adaptive LRO module 340 further includes an LRO engine 342 and a controller 355.

The LRO engine 342 aggregates the received packets into an aggregated packet based on the LRO threshold. The LRO engine 342 can be implemented as a hardware engine or can be implemented as software instructions, such as a network driver, that can be executed by a processor.

The controller 355 detects a packet loss state in the network, and adjusts the LRO threshold based on the packet loss state. The LRO threshold can be adjusted to increase aggregation efficiency, and reduce waiting time for LRO time-out. In an embodiment, the controller 355 detects a size of a sliding window used by a sender device to transmit packets to the network device 300. Further, the controller 355 adjusts the LRO threshold as a function of the size of the sliding window. The controller 355 can be implemented as software instructions that can be executed by a processor, or can be implemented by hardware circuits. In an example, the controller 355 is implemented by control instructions 375 stored in the memory unit 370. The control instructions 375 can be executed by the CPU 360.

The controller 355 can use any suitable algorithm, protocol, standard, and the like, to detect the size of the sliding window used by a sender device to transmit packets to the network device 300. In an embodiment, the controller 355 detects a transmission protocol used by the sender device to adjust the sliding window for transmission. Then, the controller 355 can detect or predict the sender device status, for example, based on data packets, acknowledgement packets, LRO time-out events, and the like. Further, the controller 355 can adjust the LRO threshold based on the transmission protocol and the sender device status.

The CPU 360 executes system and application codes. For example, the CPU 360 can execute instruction codes for network processing. The memory unit 370 stores the system and application codes.

In an embodiment, the network interface module 350 is configured to perform according to a network layer of a network processing stack. The memory unit 370 stores instruction codes for a relatively higher network processing layer, such as an IP layer, a TCP layer, and the like, of the network processing stack. The instruction codes for the relatively higher network processing layer can be executed by the CPU 360 to perform functions of the relatively higher network processing layer.

During operation, for example, the controller 355 detects a re-transmission of a lost packet from the sender device. According to the transmission protocol of the sender device, the sender device resets the sliding window to one or two, for example, and retransmits the lost packet. Accordingly, the controller 355 resets the LRO threshold to one or two. The LRO engine 342 then aggregates the received packet in an aggregated packet based on the LRO threshold. The aggregated packet is then provided to a relatively higher network processing layer.

In an example, the CPU 360 executes instruction codes for the relatively higher network processing layer. The relatively higher network processing layer originates an ACK to the sender device. According to the transmission protocol of the sender device, the sender device increases the sliding window by one when an ACK is received. Thus, when the controller 355 detects the ACK to the sender device, the controller 355 increases the LRO threshold by one accordingly.

Figure 4:
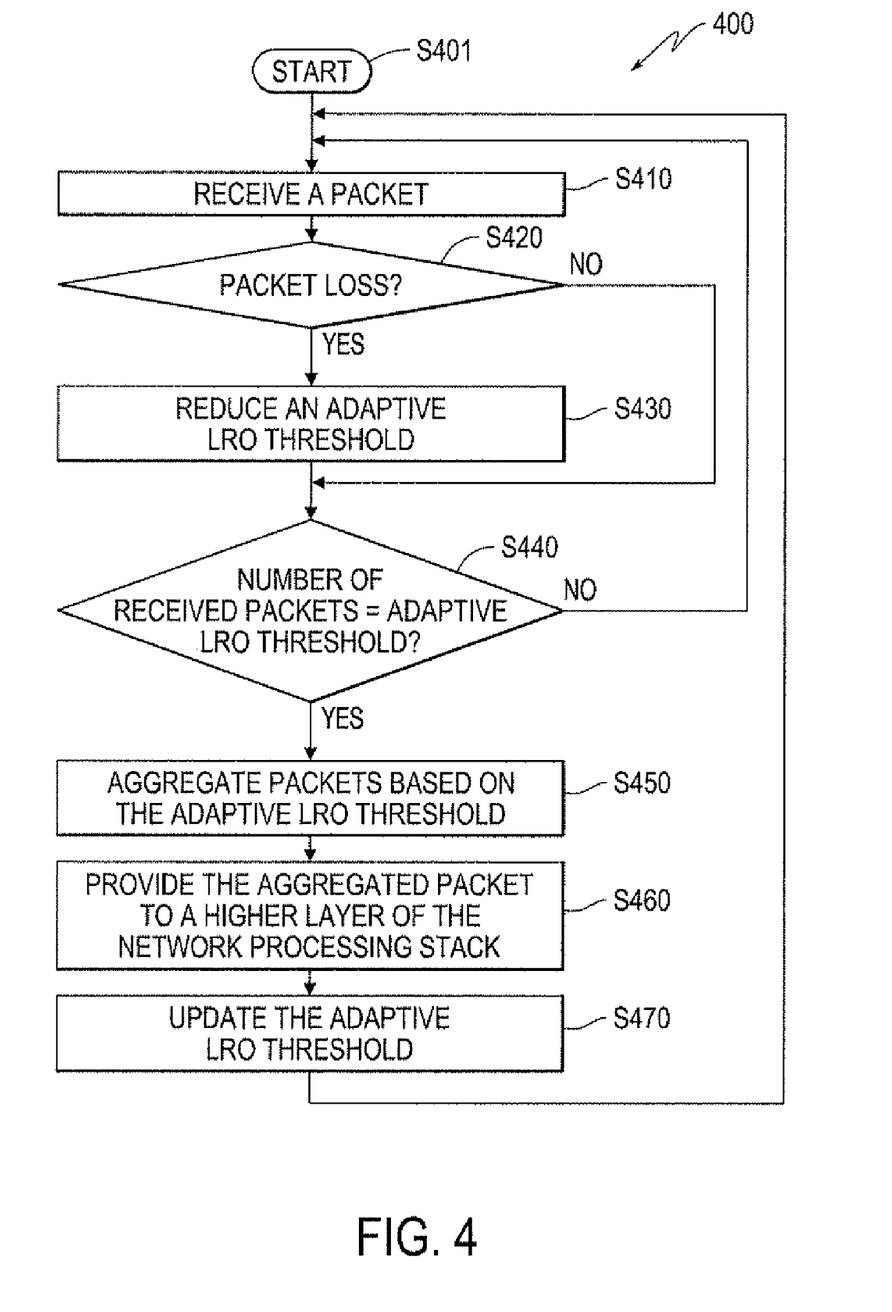
FIG. 4 shows a flow chart outlining a process example 400 for large receive offload according to an embodiment of the disclosure.

FIG. 4 shows a flow chart illustrating a process example 400 for a network node, such as the first network node 110 in FIG. 1, to perform an adaptive LRO according to an embodiment of the disclosure. The network node has set up a connection, such as a TCP connection, with a peer network node, such as the second network node 120 in FIG. 1. The network node and the peer network node can transmit packets to each other via the TCP connection. In an example, the peer network node transmits a packet stream to the network node via the TCP connection. The network node includes a network processing stack, such as a TCP processing stack. The TCP processing stack includes a plurality of network processing layers. Each network processing layer has a process overhead that is proportional to a number of packets received at the network processing layer. The network node includes an adaptive LRO module in a relatively low network processing layer, such as a network layer. The adaptive LRO module can aggregate received packets into an aggregated packet based on an adaptive LRO threshold, and provide the aggregated packet to a relatively higher network processing layer. Thus, the processing overhead of the relatively higher network processing layer can be reduced. The process starts at S401, and proceeds to S410.

At S410, the network node receives a packet. In an embodiment, an interface circuit of the network node receives electrical signals from a suitably coupled link, and obtains a packet from the electrical signals. The packet is suitably buffered in a reception memory space, such as an ingress queue, of the network node. In an embodiment, the adaptive LRO module receives a pointer to the reception memory space storing the received packet.

At S420, the adaptive LRO module detects whether there is a packet loss. In an example, when a packet loss happens, the sender device retransmits the lost packet. Thus, when the adaptive LRO module detects that the received packet corresponds to a re-transmission, for example, the adaptive LRO module detects a packet loss. When the adaptive LRO module detects a packet loss, the process proceeds to S430; otherwise, the process proceeds to S440.

At S430, the adaptive LRO module reduces the adaptive LRO threshold. In an embodiment, the adaptive LRO module adjusts the adaptive LRO threshold as a function of a size of a sliding window used by the sender device. In another embodiment, the adaptive LRO module adjusts the adaptive LRO threshold to be equal or smaller than the size of the sliding window. In an example, when a packet loss happens, the sender device resets the size of the sliding window to one or two, for example. Thus, the adaptive LRO module can reset the LRO threshold to one. In another example, when a packet loss happens, the sender reduces the sliding window by half. Accordingly, the adaptive LRO module can reduce the adaptive LRO threshold by half.

At S440, the adaptive LRO module determines whether a number of received packets equals the adaptive LRO threshold. The adaptive LRO module can include a queue to buffer packets belonging to a same packet stream before aggregation. When the number of received packets equals the adaptive LRO threshold, the process proceeds to S450; otherwise, the process returns to S410 to receive more packets.

At S450, the adaptive LRO module aggregates packets based on the adaptive LRO threshold. In an embodiment, the adaptive LRO module includes an LRO engine. The LRO engine can suitably aggregate the received packets into an aggregated packet based on the adaptive LRO threshold.

At S460, the aggregated packet is provided to the relatively higher network processing layer.

At S470, the adaptive LRO module updates the adaptive LRO threshold. In an embodiment, the adaptive LRO module detects whether the aggregated packet results in a non-duplicate ACK to the sender device. In an embodiment, a non-duplicate ACK to the sender device indicates a reception success, and subsequently results in a size increase of the sliding window at the sender device. Thus, the adaptive LRO module increases the adaptive LRO threshold accordingly. However, the adaptive LRO module can also include a maximum value of the adaptive LRO threshold to limit the adaptive LRO threshold. Thus, in an embodiment, the adaptive LRO module updates the adaptive LRO threshold based on the maximum value. The process then returns to S410.

Figure 5:
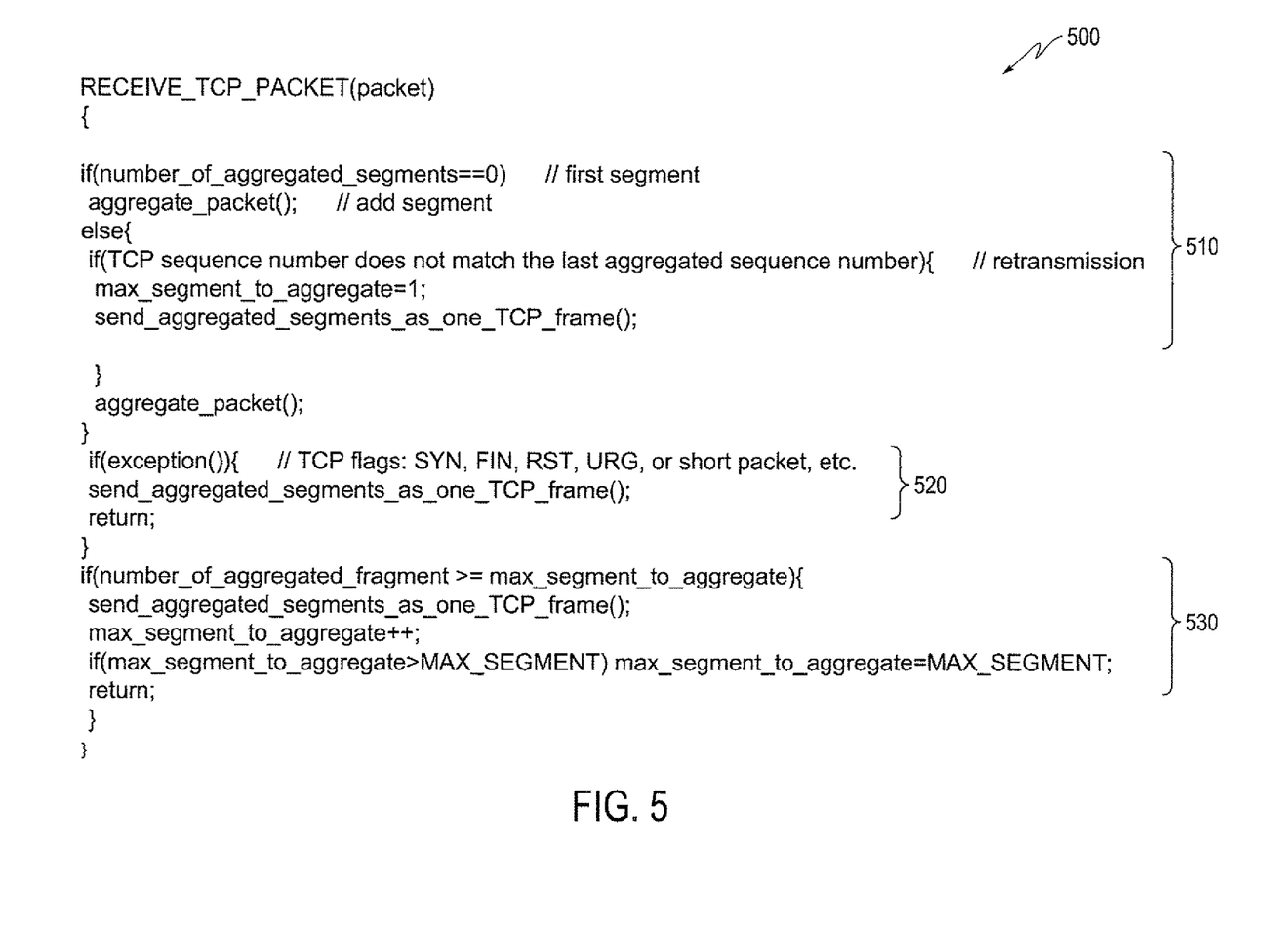
FIG. 5 shows pseudo codes for an adaptive large receive offload algorithm example 500 according to an embodiment of the disclosure.

FIG. 5 shows pseudo codes for an adaptive LRO algorithm example 500 according to an embodiment of the disclosure. The adaptive LRO algorithm 500 includes a first portion 510, a second portion 520, and a third portion 530.

The first portion 510 detects whether a received packet corresponds to a retransmission. Based on the detection, the first portion 510 adjusts an adaptive LRO threshold (max_segment_toaggregate).

The second portion 520 handles various exceptions.

The third portion 530 determines whether enough packets have been aggregated in an aggregated packet. As seen in the example of the pseudo code, when a number of packets in the aggregated packet is equal to or larger than the adaptive LRO threshold, the aggregated packet can be provided to a relatively higher network processing layer. Further, the third portion 530 updates the adaptive LRO threshold when the aggregated packet is provided to the relatively higher network processing layer.

While the invention has been described in conjunction with the specific embodiments thereof that are proposed as examples, it is evident that many alternatives, modifications, and variations will be apparent to those skilled in the art. Accordingly, embodiments of the invention as set forth herein are intended to be illustrative, not limiting. There are changes that may be made without departing from the scope of the invention.

What is claimed is:

1. A method for large receive offload (LRO), comprising:
    receiving a packet belonging to a packet stream transmitted from a sender to a receiver;

detecting a size of a sliding window based on the received packet, the sliding window being used by the sender to transmit the packet stream;

detecting that the sender reduces the size of the sliding window in response to a packet loss;

reducing a large receive offload (LRO) threshold indicating a maximum number of packets allowed in an aggregated packet in accordance with the size reduction of the sliding window; and aggregating incoming packets into an aggregated packet based on the LRO threshold.

2. The method of claim 1, wherein detecting the size of the sliding window based on the received packet, further comprises:

detecting the received packet corresponding to a re-transmission of the packet that happens when a previous transmission of the packet is lost; and determining a size reduction of the sliding window caused by the re-transmission of the packet.

3. The method of claim 1, wherein detecting the size of the sliding window based on the received packet, further comprises:

tracking on a first sequence number from the received packet; and determining the received packet corresponding to a re-transmission of the packet based on the first sequence number and at least one of a second sequence number of a previously received packet and a third sequence number in an acknowledgement (ACK).

4. The method of claim 1, further comprising:

determining that the reception of the packet results in a non-duplicate acknowledgement to the sender, the sender increasing the size of the sliding window in response to the non-duplicate acknowledgement; and increasing the LRO threshold in accordance with the increased size of the sliding window.

5. The method of claim 1, further comprising:

processing the aggregated packet as a single packet in at least one network processing layer in a TCP processing stack.

6. A network device, comprising:

a network interface configured to receive packets transmitted by a sender device;

a large receive offload (LRO) engine configured to aggregate the received packets into an aggregated packet based on an LRO threshold that indicates a maximum number of packets allowed in the aggregated packet; and a controller configured to detect a size of a sliding window based on a received packet, and adjust the LRO threshold as a function of the size of the sliding window, the sliding window being used by the sender device to transmit packets, wherein the controller is configured to detect that the sender reduces the size of the sliding window in response to a packet loss, and reduce the LRO threshold in accordance to the size reduction of the sliding window.

7. The network device of claim 6, wherein the controller is further configured to detect the received packet corresponding to a re-transmission of the packet that happens when a previous transmission of the packet is lost, determine a size reduction of the sliding window caused by the re-transmission of the packet, and reduce the LRO threshold in accordance with the size reduction of the sliding window.

8. The network device of claim 7, wherein the controller is configured to detect the received packet corresponding to the re-transmission of the packet based on a first sequence number from the received packet, and at least one of a second sequence number of a previously received packet and a third sequence number in an acknowledgement (ACK).

9. The network device of claim 6, wherein the controller is further configured to determine that the reception of the packet results in a non-duplicate acknowledgement to the sender, and increase the LRO threshold in accordance with a size increase of the sliding window by the sender in response to the non-duplicate acknowledgement.

10. The network device of claim 6, further comprising:

a processor configured to process the aggregated packet as a single packet in at least one network processing layer in a network processing stack.

11. A non-transitory computer readable medium storing program instructions for causing a processor to perform control steps of large receive offload (LRO), comprising:

receiving a packet belonging to a packet stream transmitted from a sender to a receiver;

detecting a size of a sliding window based on the received packet, the sliding window being used by the sender to transmit the packet stream;

detecting that the sender reduces the size of the sliding window in response to a packet loss;

reducing a large receive offload (LRO) threshold in accordance with the size reduction of the sliding window, the LRO threshold indicating a maximum number of packets allowed in an aggregated packet; and causing an LRO engine to aggregate incoming packets into an aggregated packet based on the adjusted LRO threshold.

12. The non-transitory computer readable medium of claim 11, wherein the control step of detecting the size of the sliding window based on the received packet, further comprises:

detecting the received packet corresponding to a re-transmission of the packet that happens when a previous transmission of the packet is lost; and determining a size reduction of the sliding window caused by the re-transmission of the packet.

13. The non-transitory computer readable medium of claim 11, wherein the control step of detecting the size of the sliding window based on the received packet, further comprises:

tracking on a first sequence number from the received packet; and determining the received packet corresponding to a re-transmission of the packet based on the first sequence number and at least one of a second sequence number of a previously received packet and a third sequence number in an acknowledgement (ACK).

14. The non-transitory computer readable medium of claim 11, wherein the control steps of LRO further comprise:

determining that the reception of the packet results in a non-duplicate acknowledgement to the sender, the sender increasing the size of the sliding window in response to the non-duplicate acknowledgement; and increasing the LRO threshold in accordance with the size increase of the sliding window.

15. The non-transitory computer readable medium of claim 11, further storing program instructions for causing a processor to process the aggregated packet as a single packet in at least one network processing layer in a network processing stack.

16. A method for large receive offload (LRO), comprising:

receiving a packet belonging to a packet stream transmitted from a sender to a receiver;

detecting a size of a sliding window based on a packet loss state, the sliding window being used by the sender to transmit the packet stream;

adjusting a large receive offload (LRO) threshold indicating a maximum number of packets allowed in an aggregated packet as a function of the size of the sliding window; and aggregating incoming packets into an aggregated packet based on the adjusted LRO threshold.

* * * * *